United States Patent
Rao et al.

(10) Patent No.: US 7,610,317 B2
(45) Date of Patent: Oct. 27, 2009

(54) SYNCHRONIZATION WITH DERIVED METADATA

(75) Inventors: Rajesh M. Rao, Sammamish, WA (US); Sameet H. Agarwal, Redmond, WA (US); Irena Hudis, Bellevue, WA (US); Vivek J. Jhaveri, Seattle, WA (US); Lev Novik, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 725 days.

(21) Appl. No.: 11/063,424

(22) Filed: Feb. 22, 2005

(65) Prior Publication Data

US 2006/0190500 A1    Aug. 24, 2006

(51) Int. Cl.
*G06F 17/30* (2006.01)

(52) U.S. Cl. .................................. 707/203; 707/248
(58) Field of Classification Search ................ 707/1, 707/10, 100, 102, 200, 203; 709/220, 248
See application file for complete search history.

(56) References Cited

U.S. PATENT DOCUMENTS

| 6,742,025 B2 * | 5/2004 | Jennery et al. | 709/220 |
| 2002/0143997 A1 * | 10/2002 | Huang et al. | 709/248 |

* cited by examiner

*Primary Examiner*—Fred I Ehichioya
(74) *Attorney, Agent, or Firm*—Russell Krajec; Krajec Patent Offices, LLC

(57) ABSTRACT

A system and method for synchronizing a database comprising raw data and metadata derived from the raw data, but when the metadata has not yet been updated. The raw data and the metadata are first synchronized, with the raw data having been assigned a version number. After synchronization, any stale metadata will be updated and assigned the same version number as the raw data.

22 Claims, 4 Drawing Sheets

SYNCHRONIZATION WITH DERIVED METADATA

BACKGROUND OF THE INVENTION a. Field of the Invention

The present invention pertains generally to computer databases and specifically to the synchronization of databases that have metadata.

b. Description of the Background

Synchronization of databases comprising raw data and derived metadata is complicated when the derived metadata are not current with the raw data.

In many databases, metadata derived from raw data is a useful tool. The metadata may simplify searching, sorting, and gross manipulation of the raw data especially when the metadata are organized to facilitate such manipulation. Further, the metadata may comprise orders of magnitude less data than the raw-data. For example, a database of documents may contain raw data containing text, figures, and numerical data, and may also include metadata such as the title, chapter headings, author, or other metadata that are derived from the raw data.

In such a database, changes to the raw data would generally be reflected in the metadata. Before the metadata is updated, and when the raw data do not correspond with the metadata, the metadata is 'stale.' Problems arise when synchronization occurs while metadata is stale, because stale metadata may be synchronized between the databases, leaving the synchronized databases in an inconsistent state.

It would therefore be advantageous to provide a system and method for synchronizing databases having derived metadata wherein the synchronization may occur at any time, without regard to the 'staleness' of any data. It would be further advantageous if such a system were robust and consumed a minimum amount of computing and communication resources.

SUMMARY OF THE INVENTION

The present invention overcomes the disadvantages and limitations of previous solutions by providing a system and method for synchronizing a database comprising raw data and metadata derived from the raw data, but when the metadata has not yet been updated. The raw data and the metadata are first synchronized, with the raw data having been assigned a version identifier. After synchronization, any stale metadata will be updated and assigned the same version identifier as the raw data.

Some databases are comprised of raw data and metadata. Some of the metadata may be derived from the raw data. As changes are made to the raw data, analysis routines may examine the raw data and update the metadata. Similarly, when changes are made to the metadata, those changes may be incorporated back into the raw data. In some instances, these analysis routines may be executed at some time after the initial changes are made. For a period of time, the raw data and metadata are not coordinated and the metadata is considered "stale."

The synchronization process may be performed on a snapshot of the database, which may contain stale metadata. The synchronization process may update both the metadata and raw data as they are, and assign a version identifier to both sets of data. After synchronization is complete, the raw data may be analyzed and any stale metadata may be updated. When the first analysis and update occurs, but before the metadata are released for manipulation, the version identifier of the metadata is set to the raw data's version identifier. Both synchronized databases may then have metadata that are properly related to and derived from the raw data, while keeping the version identifier of the synchronized version.

Any subsequent changes to the raw data or metadata would cause changes to the version identifier, flagging that data for synchronization. Because the stale metadata were updated and assigned the version identifier of the raw data, those metadata will not be flagged for synchronization, unless they are subsequently modified.

This system is suited to databases that comprise file systems, including hierarchical directory structures. Other databases that may employ this system include those having separate stores for metadata and raw data, including those having one or more datafiles to store metadata, and one or more datafiles to store raw data.

The advantages of the present invention are that synchronizations may occur at any time, regardless of the staleness of the raw data or metadata. After synchronization, the metadata may be made fresh without flagging the metadata for re-synchronization.

DETAILED DESCRIPTION OF THE INVENTION

Figure 1:
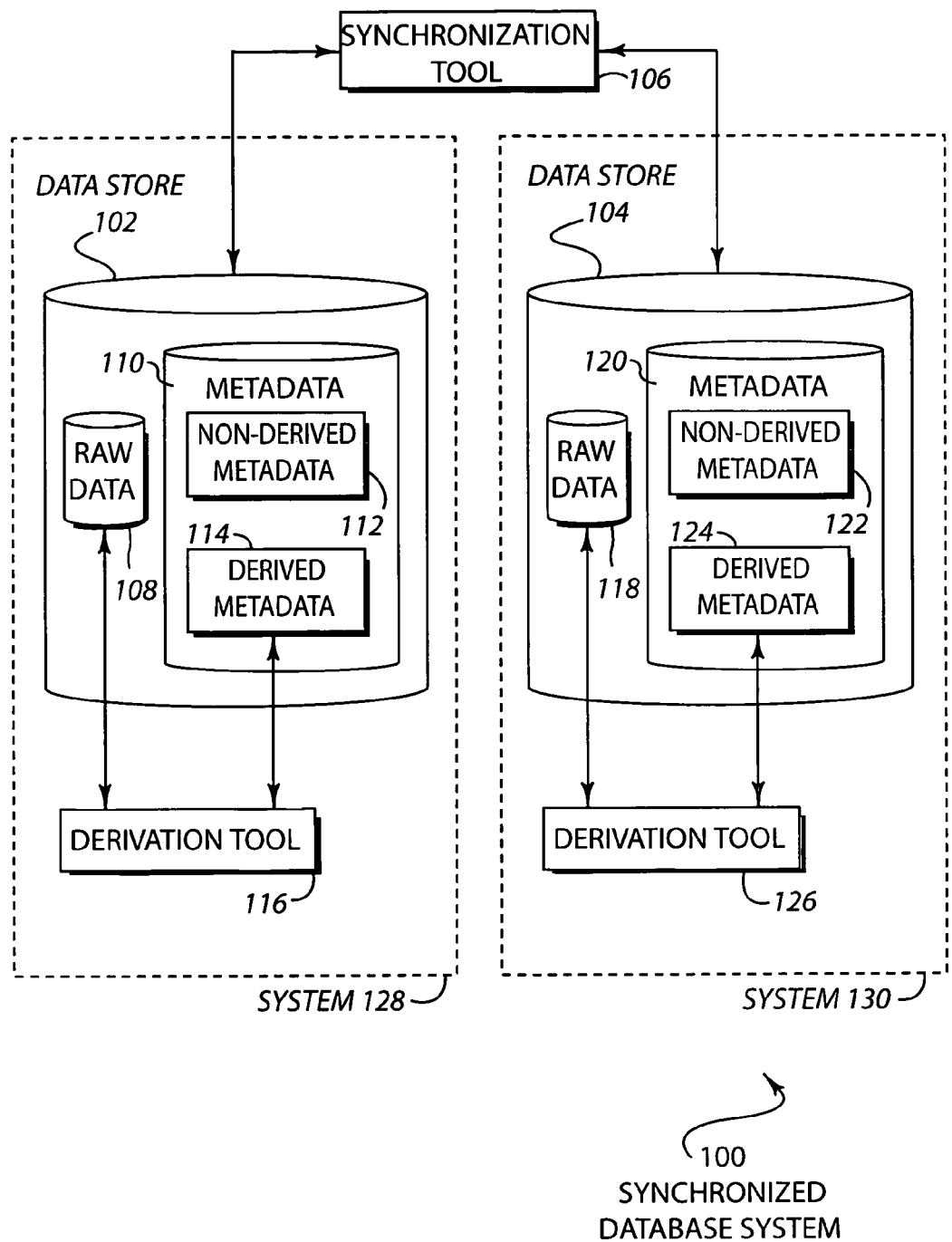
FIG. 1 is a diagrammatic illustration of an embodiment showing a synchronized database system.

While the invention is susceptible to various modifications and alternative forms, specific embodiments of the invention are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. In general, the embodiments were selected to highlight specific inventive aspects or features of the invention.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The invention may be embodied as devices, systems, methods, and/or computer program products. Accordingly, some or all of the invention may be embodied in hardware and/or in software (including firmware, resident software, micro-code, state machines, gate arrays, etc.) Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the invention is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 illustrates an embodiment 100 of the present invention showing a synchronized database system. The datastores 102 and 104 are synchronized using a synchronization tool 106. Datastore 102 contains raw data 108 and metadata 110. Metadata 110 contains non-derived metadata 112 and derived metadata 114. The derived metadata 114 are derived from the raw data 108 using the derivation tool 116.

Datastore 104 is a replica of datastore 102. Datastore 104 contains raw data 118, and metadata 120 that comprises non-derived metadata 122 and derived metadata 124. The derived metadata 124 are derived from the raw data 118 using a derivation tool 126.

Datastore 102 may be part of system 128 while datastore 104 may be part of system 130.

Databases having derived metadata pose some unique problems upon synchronization, especially when the derived metadata are not updated with respect to the raw data. Typically, the data will appear as modified when any action taken on either raw data or metadata after synchronization. Further, if the metadata do not properly correlate with the raw data, an inconsistency in the data exists.

When a synchronization of two datastores occurs and the derived metadata is not consistent with the raw data, the derived metadata is identified as 'stale.' After synchronization, the stale metadata are re-derived from the raw data making the metadata fresh. The version identifier of the raw data that identifies the raw data as synchronized is transferred to the newly derived metadata. Any subsequent modification of the raw data or metadata will change the version identifier, tagging the data for synchronization.

Such a system and method prevents the newly-derived metadata from being flagged as being modified and requiring synchronization, and such a system keeps all derived metadata consistent with the raw data. Further, such a system may also include non-derived metadata without requiring special handling of non-derived metadata.

The database in datastores 102 and 104 contain both raw data 108 and 118 and metadata 110 and 120. Metadata are often very helpful in performing many tasks associated with a database, especially operations that do not require the use of the raw data. For example, metadata may be suited for searching, cataloging, and manipulating the raw data at a high level. In some databases, the raw data may be orders of magnitude larger in size than the metadata. In such cases, operations across much of the raw data may be performed by metadata much more efficiently than the same operations using only the raw data.

In some databases having metadata, some of the metadata may be derived from the raw data. For example, in a database of word processor documents, the metadata may include the author, title of the document, abstract, and the time of last revision. The corresponding raw data may be many pages of formatted text, graphics, and tabulated numbers. In such an example, the metadata may be extracted from the raw data by reading the raw data, looking for certain fields or identifiers, and pulling the metadata directly from the raw data.

In another example of a database of music recordings, the metadata may include the artist, album, and song title comprising a few kilobytes of data. The corresponding music data may be megabytes in size. The metadata may be extracted by finding an identifier in the raw data, looking up the corresponding metadata in another database, and deriving the various metadata. In such an example, the raw data may include a unique identifier that may be used in a query of a separate database to determine various metadata. The parameter values of derived metadata may or may not be expressly included in the raw data.

The extraction of metadata from raw data is performed by the derivation tools 116 and 126. In some embodiments, different derivation tools 116 and 126 may be used for different file types. In the example of the word processor documents, a specific derivation tool may be used for extracting metadata only from specific word processor files. Different derivation tools may be created for different word processor formats. Separate derivation tools may be used for determining metadata from the music recording and the document databases, for example. Some embodiments may only use a single type of raw data while other embodiments may include many different raw data types and formats.

In some embodiments, the derivation tool 116 or 126 may operate asynchronously from the modification of the raw data 108 and 118. In such an embodiment, the derivation tools 116 or 126 may perform the derivation function after the raw data is stored and in a background operation. For example, a user may create and save a document. After saving the document, the user may begin another task. After the user begins the second task, the derivation tool may begin when the system processor has some unused processing cycles. In this manner, the raw data may be saved immediately and the user may begin another task without having to wait for the derivation tool to finish.

When the metadata is updated asynchronously, there are times when the raw data and the metadata are not properly correlated. If the user were to query metadata that is stale, some embodiments may permit the derivation tool to perform its task before allowing the query. Other embodiments may allow limited queries of the metadata even when stale.

In some embodiments, changes to the metadata may cause the derivation tools 116 and 126 to make corresponding changes to the raw data. For example, if a user changes the metadata of a document to reflect a change to the title of the document, the derivation tools 116 and 126 may update the corresponding area of the raw data. Before the update occurs, the raw data may be stale with respect to the metadata.

When a database synchronization occurs and the metadata are stale, additional complications may arise. After synchronization, the two databases may each contain current raw data and stale metadata. By adhering to the theory that the raw data is presumably more current than the metadata, any stale metadata is overwritten with newly extracted metadata, ensuring that the raw data matches the metadata.

Figure 2:
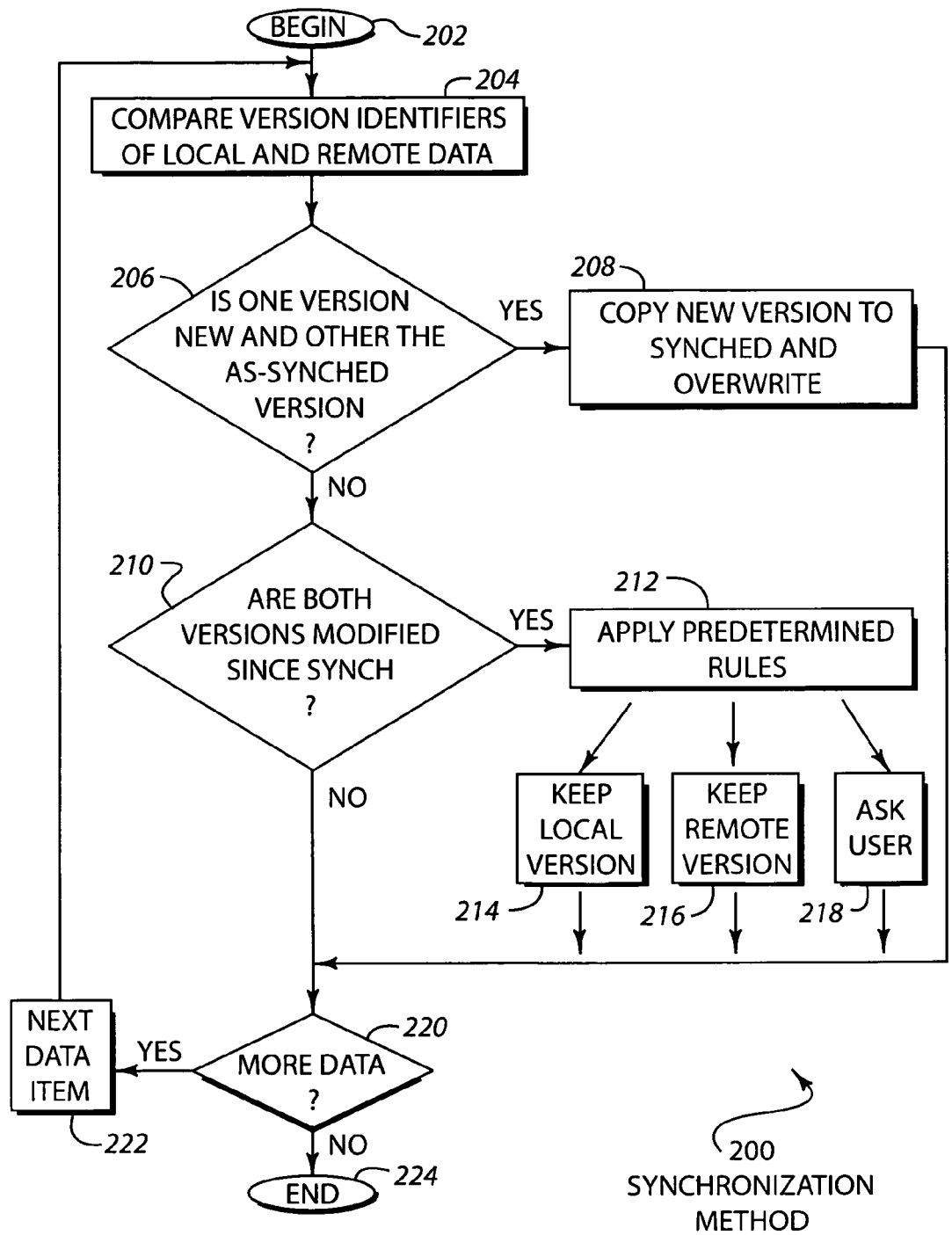
FIG. 2 is a flowchart illustration of an embodiment showing a synchronization method.

FIG. 2 illustrates an embodiment 200 showing a synchronization method. The process begins in block 202. For the first piece of data, either raw data or metadata, the version identifiers of local and remote data are compared in block 204. If one version is new and the other one the as-synched version in block 206, the new version is overwritten on top of the synched version in block 208.

If both versions have been modified since the last synchronization event in block 210, predetermined rules are applied in block 212. Some rules may require that the local version is kept in block 214, the remote version may be kept in block 216, or the user may be queried in block 218.

If neither the local or remote versions have been modified since the last synchronization event, no action is taken.

If there are more data in block 220, the next data is retrieved in block 222 and the process begins anew at block 204.

The synchronization routine illustrated in embodiment 200 is a basic method whereby each piece of data is analyzed to determine if that data has been modified since the last synchronization. If the data has been modified but the corresponding version in the other synchronized database has not, the modified data overwrites the older, synched version. If both versions have been modified, a conflict exists and the predetermined rules in block 212 may help determine the way to handle the conflict.

In some embodiments, the rules may be user selectable or may be hidden from the user. Further, the rules may be as complex as the situation requires. For example, a rule may keep all changes made over a weekend period on the local version, but applied to a specific subgroup of the data. Those skilled in the arts may develop various rules as necessary for the particular implementation desired, as the rules discussed in this application are merely exemplary and not all encompassing.

In some cases, the rules in block 212 may be different for metadata and raw data. For example, the rules may keep some or all of the local metadata but may also keep the remote raw data. The rules may be conflicting when the metadata are derived from the raw data, since after synchronization new metadata may be present with old raw data or vice versa.

When the new version of data is overwritten in block 208, the version identifier of the new version may be assigned to the synchronized copies of the data. That version identifier may then become the synchronized version identifier.

If a conflict exists and the predetermined rules of block 212 are applied, the resulting data that is synchronized may be assigned a different, incremented version identifier. For example, if the synchronized version identifier was a first version identifier and both versions of the data were a second version identifier, a conflict will arise. When the conflict is resolved, both sets of data may have a third version identifier as the synchronized version identifier.

Figure 3:
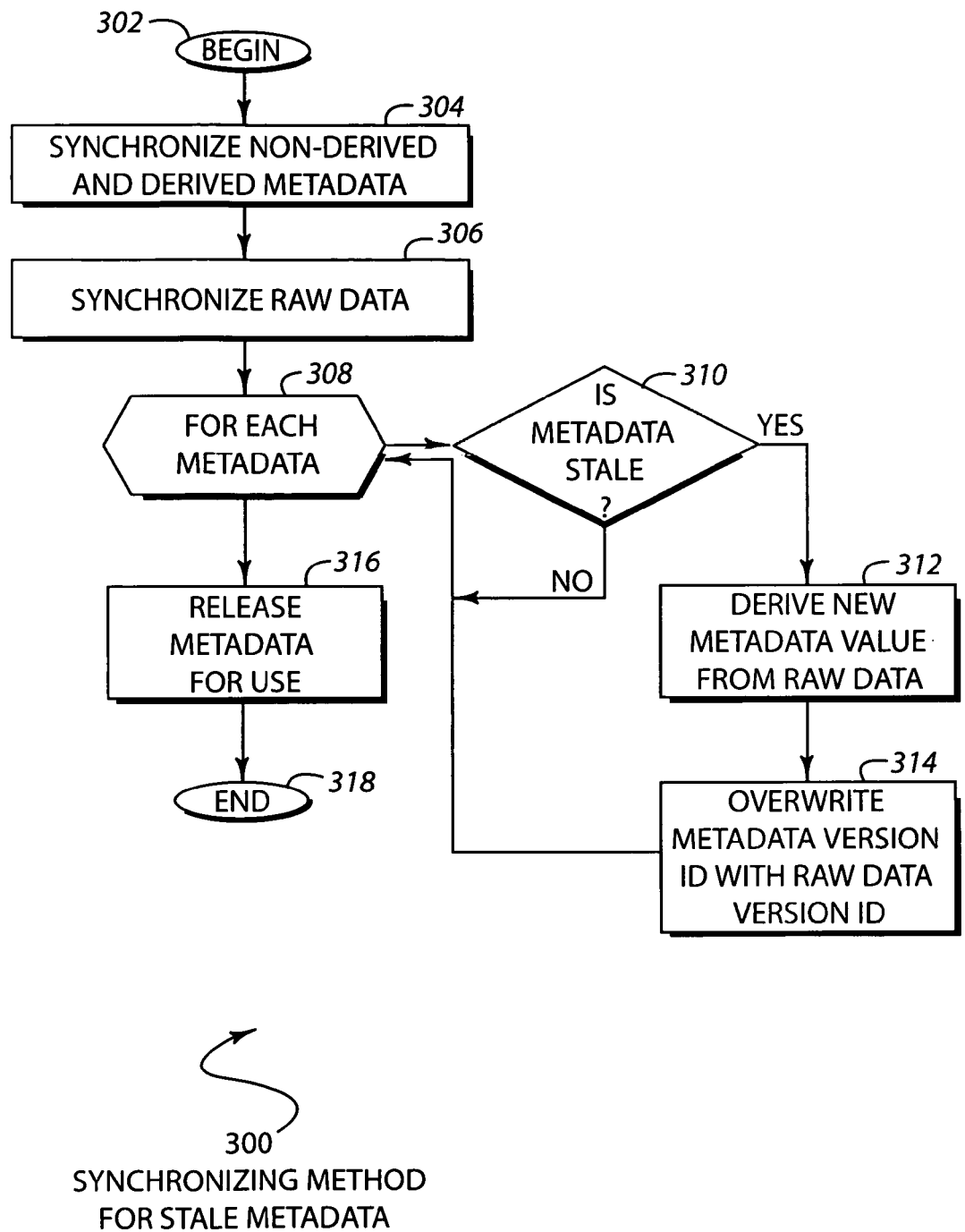
FIG. 3 is a flowchart illustration of an embodiment showing a synchronization method for stale metadata.

FIG. 3 illustrates an embodiment 300 showing a method for synchronizing with stale metadata. The process begins in block 302. Derived and non-derived metadata are synchronized in block 304. The raw data are synchronized in block 306. For each metadata item in block 308, the metadata is checked for staleness in block 310. If the metadata is stale in block 310, new metadata are derived from the raw data in block 312. In block 314, the newly derived metadata are assigned the same version identifier as the raw data. When all the metadata are updated, the metadata are released for use in block 316 and the process ends in block 318.

The embodiment 300 illustrates how derived metadata may be kept current with the raw data while complying with potentially conflicting synchronization rules.

The metadata and raw data are synchronized between the two databases in blocks 304 and 306. Before the metadata are released for use in block 316, each stale metadata item is updated by and correlated to the corresponding raw data. This process ensures that the metadata will be properly correlated with the raw data, regardless if the synchronization rules are inconsistent and one of the metadata or the corresponding raw data are updated while the other one is not.

Additionally, the version identifier assigned to the raw data is also assigned to the metadata. This step prevents the updated metadata from being identified as an updated version and causing the metadata to be identified for synchronization again.

Since the raw data and the metadata derived from that raw data are correlated, the version identifiers of both the raw data and derived metadata are the same when they are correlated. When the version identifiers are not the same, one of the metadata or raw data are stale.

If there is a conflict in the raw data, such that both versions of the raw data have been changed since the last synchronization event, the resolution of the raw data conflict will occur in block 306. As described in embodiment 200, if a conflict between the data is encountered, the version identifier assigned to the synchronized data after the conflict resolution may be an incremented version identifier. By incrementing the version identifier because of the conflict resolution, any derived metadata may thereby be made stale. Embodiment 300 may then re-derive the derived metadata, making the metadata fresh again.

The embodiment 300 has an underlying principle that the raw data has a priority over the metadata. When a conflict arises, the conflict is satisfied when the metadata are forced to correlate to the raw data.

Figure 4:
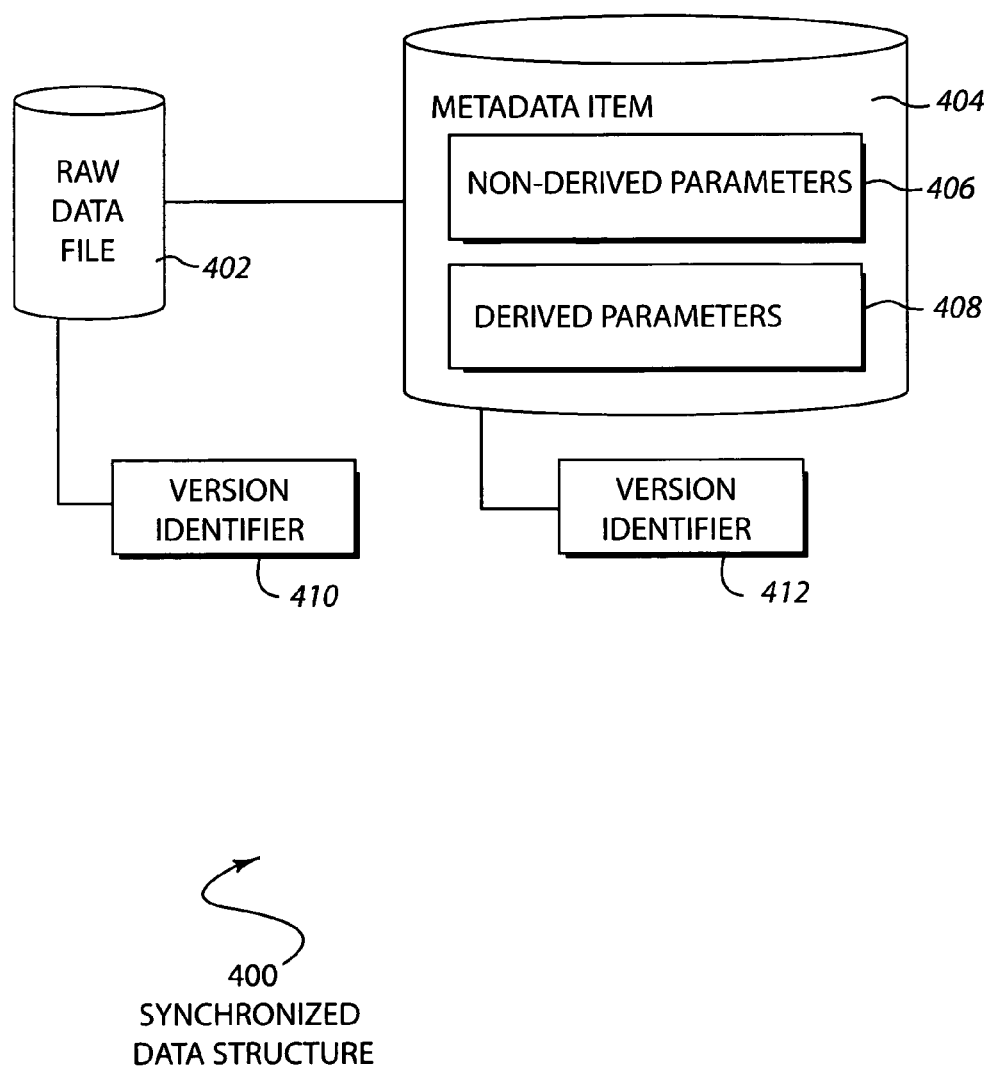
FIG. 4 is a diagrammatic illustration of an embodiment showing a data structure for raw data and metadata.

FIG. 4 illustrates an embodiment 400 showing a synchronized data structure. The raw data file 402 is related to a metadata item 404. The metadata item 404 comprises one or more non-derived parameters 406 and one or more derived parameters 408. The raw data file 402 has a version identifier 410. Similarly, the metadata item 404 has a version identifier 412.

The metadata item 404 may have both derived and non-derived parameters. A non-derived parameter may be any type of parameter that cannot be extracted from the raw data. In an example of a raw data file that contains a music recording, a user's rating of the song may not be derivable from the actual raw data. Such non-derived data may be added to the metadata item.

When a synchronization process such as the embodiment 300 is performed on the data structure of embodiment 400, the latest versions of both the raw data file 402 and the metadata item 404 are synchronized. If the version identifiers 410 and 412 are different, the derived parameters 408 are extracted from the raw data file 402. The non-derived parameters 406 remain as they were after synchronization.

In such an example, if a newer version of the metadata 404 were synchronized at the same time as an older version of the raw data file 402, the derived parameters 408 would be changed to match the older raw data, but the non-derived parameters 406 may be left unchanged. In this case, even though the older version of the raw data file 402 is kept, the newer versions of the non-derived parameters 406 are also kept.

Many different embodiments exist for the version identifiers 410 and 412. In some embodiments, a date and time stamp may be used. In other embodiments, a counter may be incremented each time the raw data file 402 or metadata item 404 are updated, and the version identifier may be an integer number. Various other methods for determining a version identifier may be used by those skilled in the arts while keeping within the spirit and intent of the present invention.

In some embodiments, individual computer files may be used to store the raw data. Each of the data files may have one or more associated metadata items. In some embodiments, a single metadata item may have associations with more than one data file.

The raw data files may be computer files arranged in a hierarchical arrangement, such as a directory structure or other type of file structure. The files of each directory may be of mixed types or the same type. In other embodiments, the raw data may be grouped in any manner that is useful to the user.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A synchronization system comprising:
   a first version identifier defined at a synchronization event and assigned to synchronized data;
   said synchronized data comprising raw data and metadata extracted from said raw data; and
   synchronized systems each comprising a datastore, said synchronized systems adapted to:
      synchronize said raw data;
      examine said metadata to determine that a set of metadata is not current;
      derive said set of metadata from said raw data by analyzing said raw data; and
      assign said first version identifier to said set of metadata, wherein said set of metadata comprises an indicator configured to indicate if said metadata is current;
      synchronize said raw data by a method comprising:
         determining a synchronized version identifier that was assigned during a prior synchronization event;
         determining that a version identifier for a first piece of synchronized data on a first system is newer than said synchronized version and that the version identifier for a corresponding version of said first piece of synchronized data on a second system is said synchronized version; and
         replacing said first piece of synchronized data on said second system with said first piece of synchronized data on said first system.

2. The synchronization system of claim 1 wherein said first version identifier is unique for each piece of synchronized data.

3. The synchronization system of claim 1 said synchronized systems further adapted to:
   release at least a portion of said synchronized data for updates after said examine said metadata, said derive said set of metadata, and said assign said first version identifier.

4. The synchronization system of claim 1 said synchronized systems further adapted to:
   permit changes to at least a portion of said synchronized data while performing the operations of said examine said metadata, derive said set of metadata, and assign said first version identifier.

5. The synchronization system of claim 1 wherein at least a portion of said synchronized data are data taken from a snapshot of said raw data and said metadata.

6. The synchronization system of claim 5 wherein said at least a portion of said synchronized data comprises said metadata.

7. The synchronization system of claim 1 wherein said synchronized systems are further adapted to:
   update a second piece of synchronized data; and
   assign a new version identifier to said second piece of synchronized data.

8. The synchronization system of claim 1 wherein one of said synchronized systems is a server computer.

9. The synchronization system of claim 1 wherein said synchronized data comprises a file system.

10. The synchronization system of claim 9 wherein said raw data comprises information stored in files.

11. The synchronization system of claim 9 wherein said file system is a hierarchical file system.

12. A system comprising:
    a first group of raw data stores;
    a first group of items comprising metadata derived from said raw data stores;
    a first system having a first storage area comprising said first group of raw data stores, said first system further having an item repository, said first item repository comprising said first group of items; and
    a second system having a second storage area comprising a second group of raw data stores and a second item repository, said second system being adapted to:
       while connected to said first system: synchronize and associate a first version identifier with said first group of data stores and said second group of data stores, synchronize and associate said first version identifier with said first item repository and said second item repository; and after disconnecting from said first system: analyze said second group of data stores, deriving metadata for one of said items, said metadata being derived from said second group of raw data stores, and associate said first version identifier with said one of said items;

while disconnected from said first system: update said one group of said raw data and assign an updated version identifier to said one group; and when reconnected to said first system: determine a synchronized version identifier that was assigned during a prior synchronization event, determine that said undated version identifier is newer than said synchronized version, and replace said one group on said first system with the corresponding said one group of said raw data on said first system.

13. The system of claim 12 wherein said first group of raw data stores comprise files stored in a directory structure.

14. The system of claim 13 wherein said directory structure is a hierarchical directory structure.

15. The system of claim 12 wherein said analyze said second group of data stores comprises:
identifying the type of a file; and
deriving values of predetermined items based on said type.

16. The system of claim 12 wherein said first system is a server computer.

17. The system of claim 12 wherein said second system is a client computer.

18. The system of claim 12 wherein said second system is further adapted to, when reconnected to said first system, determine that the version identifier for said corresponding version of said one group on said second system has been assigned said first version identifier.

19. A method comprising:
identifying data to synchronize, said data comprising raw data and metadata derived from said raw data;

synchronizing said data between a first data store connected to a first system and a second data store connected to a second system, and assigning a first version identifier for each raw data and metadata that is synchronized while said first system is connected to said second system;

disconnecting said first system from said second system;

while disconnected to said first system, determining that a portion of said metadata is not current with respect to said raw data, creating said portion of said metadata by deriving said metadata from said raw data, and assigning said first version identifier to said metadata that was updated;

wherein said set of metadata comprises an indicator configured to indicate if said metadata is current;

when disconnected from said first system, updating one group of said raw data and assigning an updated version identifier to said one group on said second system; and when reconnected to said first system, determining a synchronized version identifier that was assigned during a prior synchronization event, determining that said updated version identifier is newer than said synchronized version, and replacing said one group on said first system with the corresponding said one group on said first system.

20. The method of claim 19 wherein said raw data comprises a file system.

21. The method of claim 20 wherein said file system comprises a hierarchical file structure.

22. A computer-readable medium having computer-executable instructions for performing the steps recited in claim 19.

* * * * *